United States Patent
Margalit (10) Patent No.: US 11,334,447 B2
(45) Date of Patent: May 17, 2022

(54) INTEGRATED CIRCUIT FACILITATING SUBSEQUENT FAILURE ANALYSIS AND METHODS USEFUL IN CONJUNCTION THEREWITH

(71) Applicant: NUVOTON TECHNOLOGY CORPORATION, Hsinchu Science Park (TW)

(72) Inventor: Ilan Margalit, Tel-Aviv (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/004,636

(22) Filed: Aug. 27, 2020

(65) Prior Publication Data
US 2022/0066884 A1  Mar. 3, 2022

(51) Int. Cl.
*G06F 11/14* (2006.01)
*G06F 30/32* (2020.01)
*G06F 115/02* (2020.01)

(52) U.S. Cl.
CPC .......... *G06F 11/1469* (2013.01); *G06F 30/32* (2020.01); *G06F 2115/02* (2020.01); *G06F 2201/82* (2013.01)

(58) Field of Classification Search
CPC ...... G06F 11/14; G06F 11/1469; G06F 30/32; G06F 11/07; G06F 11/0748
See application file for complete search history.

(56) References Cited

U.S. PATENT DOCUMENTS

| | | | |
|---|---|---|---|
| 5,497,490 A | 3/1996 | Harada et al. | |
| 5,768,568 A | 6/1998 | Inui et al. | |
| 6,445,606 B1* | 9/2002 | Khoury | G11C 8/20 365/104 |
| 6,601,190 B1* | 7/2003 | Meyer | G06F 11/006 714/27 |
| 7,498,839 B1* | 3/2009 | Jenkins, IV | H03K 19/17748 257/207 |
| 2003/0115518 A1* | 6/2003 | Kleveland | G11C 29/4401 714/718 |
| 2005/0212092 A1* | 9/2005 | Nishizawa | H01L 21/78 257/622 |
| 2006/0168471 A1 | 7/2006 | Schulstad | |
| 2009/0172483 A1* | 7/2009 | Anzou | G11C 29/4401 714/723 |

(Continued)

OTHER PUBLICATIONS

"CMOS RAM"; Nov. 2020; pp. 1-2; <https://www.tech-faq.com/cmos-ram.html>.

(Continued)

*Primary Examiner* — Kamini B Patel
(74) *Attorney, Agent, or Firm* — Oliff PLC (57) ABSTRACT

A chip aka integrated circuit, the chip comprising configuration register/s, typically volatile, and/or at least one on-chip non-volatile memory m typically including at least one reserved memory location, which may be reserved for storing contents of at least one typically volatile configuration register r, from among the configuration registers; and/or apparatus configured for, at least once, storing values which may be indicative of content of at least one typically volatile configuration register r from among the registers, e.g. in the on-chip non-volatile memory m, e.g. at the at least one reserved memory location.

14 Claims, 2 Drawing Sheets

(56) References Cited

U.S. PATENT DOCUMENTS

| | | |
|---|---|---|
| 2010/0037042 A1 | 2/2010 | Kuo |
| 2013/0111275 A1 | 5/2013 | Ganesan et al. |
| 2013/0173970 A1* | 7/2013 | Kleveland ............ G11C 29/808 |
| | | 714/710 |
| 2014/0297928 A1* | 10/2014 | Moschopoulos ..... G06F 9/4403 |
| | | 711/103 |
| 2014/0325286 A1 | 10/2014 | Ganesan et al. |
| 2014/0325315 A1* | 10/2014 | Warnes ................. G11C 29/52 |
| | | 714/767 |
| 2015/0254017 A1* | 9/2015 | Soja ...................... G06F 3/0622 |
| | | 711/103 |
| 2017/0168112 A1* | 6/2017 | Redburn .......... G01R 31/31703 |
| 2019/0243952 A1* | 8/2019 | Dekker ............... H01L 27/0203 |

OTHER PUBLICATIONS

Pedroni; "Finite State Machines in Hardware: Theory and Design (with VHDL and SystemVerilog)"; The MIT Press; 2013: pp. 1-337.

\* cited by examiner

INTEGRATED CIRCUIT FACILITATING SUBSEQUENT FAILURE ANALYSIS AND METHODS USEFUL IN CONJUNCTION THEREWITH

FIELD OF THIS DISCLOSURE

The disclosure relates to hardware generally and more specifically to semiconductor devices.

BACKGROUND

Various types of persistent storage of configuration, whether in NVM, or in the Legacy "CMOS memory", are known.

The following https www link: tech-faq.com/cmos-ram.html describes a method for keeping system configuration settings in the PC field.

Other prior art pertaining to capturing system configurations includes: U.S. Pat. No. 5,497,490A (IBM, 1991); U.S. Pat. No. 5,768,568A (IBM, 1997); US20100037042A1 (Foxconn, 2008); U.S. Pat. No. 6,601,190B1 (HP, 1999); US20130111275A1 and US20140325286A1 (Dell, 2011); and US20060168471A1 (Tandberg Storage ASA, 2005).

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

The following terms may be construed either in accordance with any definition thereof appearing in the prior art literature or in accordance with the specification, or to include in their respective scopes, the following:

The term "write transaction" or "write operation" is intended to include any operation of a processor or other type of master, which posts a destination address and data to be written, and which results in the data being placed in the destination pointed to by the address, which may be any suitable destination including but not limited to a register, an IO port, or a memory address. The write transaction may include a request message, or a logical combination of control signals, indicating that the operation to be carried out is a Write.

The terms chip, device, and integrated circuit, may be interchanged.

The terms "programming a register" and "writing a register" may be interchanged.

A configuration register is intended to include any register which stores a value which affects the functionality of the device e.g. changes the device's operating frequency, changes the functions of the device's IOs, or enables or disables certain device functions.

According to some embodiments, the bits or values in a configuration register are applied to an integrated circuit, resulting in plural configurations thereof.

Certain embodiments seek to facilitate reconstruction of a failure (e.g. a failed chip) by providing (typically non-volatile) information supporting failure analysis of the chip, within the chip, since failure analysis often needs to be performed only on the basis of information derivable from the chip itself, with no additional information available.

A chip has a vast range of workable configurations, which makes conventional failure reconstruction extremely difficult. However, embodiments of the invention leverages the fact that, once the application system puts all necessary settings in the chip's configuration registers, this means that a certain workable configuration from among the vast range of workable configurations has been practically selected, for this chip; storing this configuration within the chip for eventual retrieval in the context of later failure analysis, if any, thus yields a tremendously advantageous shortcut for failure analysis.

Certain embodiments seek to provide an improved integrated circuit which is designed, e.g. as described herein, to facilitate any of the functionalities described herein.

Certain embodiments seek to provide a chip or integrated circuit including all or any subset of NVM, configuration register/s, an NVM writer e.g. as described herein, an indicator which inhibits the NVM writer after the NVM writer runs once, and a trigger for the NVM writer. The chip may be embedded in an application system which may store setting/s of the chip in the chip's configuration registers.

Certain embodiments seek to provide a method in which a chip is designed (typically including, for at least one configuration register, identifying an NVM in which configurations stored in that register will be stored in a non-volatile manner), and/or building a processor which, when that processor configures the device, puts the configurations in that NVM, and/or noting in chip literature, which configurations are stored in which NVM.

Certain embodiments seek to provide an NVM write operational flow including all or any subset of the following operations, suitably ordered e.g. as follows:

1. Provide a non-volatile indicator (e.g. one bit or more for safety) for the completion of keeping the configuration.

2. Upon exit from reset, if the indicator says "done", the NVM write is simply kept disabled and does nothing. If not, the following happens.

3. Upon trigger (e.g. "Store Register Setting" trigger as illustrated), the NVM writer does the following:
   a. Reads the designated storage address.
   b. Is the value at default (erased)?
   c. If at default—write the register value to the designated location.
   d. Else, skip the writing, by the assumption it was already stored in a previous configuration sequence.

4. Upon completion of device configuration, the firmware code would set the non-volatile indicator.

5. Upon subsequent power or reset cycles, perform operation 2.

If, for some reason, e.g. user interruption or system malfunction occurs, configuration is not completed in one sequence, and the sequences which follow will complete this by the above operations.

There are thus provided at least the following embodiments:

Embodiment 1. A chip aka integrated circuit, the chip comprising
  volatile configuration registers; and/or
  at least one on-chip non-volatile memory m typically including at least one reserved memory location, which is reserved for storing contents of at least one volatile configuration register r, from among the volatile configuration registers; and/or apparatus configured for, at least once, storing values indicative of content of at least one volatile configuration register r from among the registers, typically in the on-chip non-volatile memory m, at the at least one reserved memory location.

The apparatus may include an NVM writer and the trigger described elsewhere herein may be provided.

Typically, the at least one location (which may include many such locations) includes at least one entire space or zone or region, comprising plural or many locations, within the non-volatile memory m.

The at least one memory location is "reserved" in the sense that none of the firmware and hardware on the chip are configured to use the reserved memory location for their own purposes i.e. for purposes other than storing content which is provided by the recited apparatus. This ensures that space for this embodiment is secured within the total space available on the chip.

The at least one reserved memory location may include storage space allocation for one or more registers where each register is typically several bytes wide.

The decision on how many registers to allocate storage space for depends on area and cost limitations, and on the complexity of the configuration of a given chip.

Embodiment 2. A system according to any of the preceding embodiments wherein the apparatus comprises hardware, inside the chip.

Embodiment 3. A system according to any of the preceding embodiments wherein the apparatus comprises firmware, inside the chip.

An advantage of implementing the apparatus in hardware, e.g. entirely in hardware as opposed to entirely in firmware, or as opposed to partly in hardware and partly in firmware, is that storing of register values does not interrupt regular execution and functionality of the chip, such that the operation of the apparatus is transparent to the application. However, in some use-cases, the chip can afford the time of letting firmware store a copy of register values to the NVM.

Embodiment 4. A chip designing method comprising:
using electronic design automation (EDA) software for designing at least one chip which typically includes, in the chip, non-volatile memory (NVM) and/or volatile configuration registers; wherein the designing typically comprises providing the at least one chip with NVM writing functionality configured to, at least once, write, onto the non-volatile memory, at least one setting which typically has been stored, by the application system, in at least one of the chip's volatile configuration registers.

Embodiment 5. A system according to any of the preceding embodiments wherein the apparatus aka "NVM writer", during a write to the at least one volatile configuration register r, receives an address of the at least one volatile configuration register r, receives at least some data written to the at least one volatile configuration register r, and stores the data in the at least one reserved memory location.

Embodiment 6. A system according to any of the preceding embodiments wherein the apparatus is triggered by a trigger and wherein the trigger is, at least once, generated upon identification of a write to the register r.

Identification of a write may be in accordance with the designer's definition of which configuration registers are supposed to be covered by the suggested mechanism or NVM writer.

Typically, the NVM writer is triggered upon a write transaction to each register within the predefined register scope e.g. including the register content or values which are to be kept in non-volatile memory inside the chip.

Once triggered, the NVM writer (e.g. as illustrated) or mechanism issues a write transaction, with the same data as the above transaction, to the NVM space allocated for storing the value of the subject register.

Embodiment 7. A system according to any of the preceding embodiments wherein the apparatus is configured to store the contents in the memory m, only when the application system in which the chip resides first powers-up, and not on each subsequent power-up of the application system.

Embodiment 8. A system according to any of the preceding embodiments wherein the apparatus, having once stored contents of the at least register r, in the on-chip non-volatile memory m, is then inhibited aka disabled, at least once, from storing contents of the at least register r, in the on-chip non-volatile memory m.

Typically, the apparatus is permanently or fixedly or consistently inhibited so that the apparatus, having once stored contents of the at least register r, in the on-chip non-volatile memory m, never again stores contents of the at least register r, in the on-chip non-volatile memory m.

Embodiment 9. A system according to any of the preceding embodiments wherein the apparatus, having once stored contents of the at least register r, in the on-chip non-volatile memory m, is thereafter inhibited from ever again storing contents of the at least register r, in the on-chip non-volatile memory m.

Embodiment 10. A system according to any of the preceding embodiments wherein a trigger of the apparatus is provided whose logic ensures that the apparatus does not, during subsequent writes to the register r, store data written to register r, in the at least one reserved memory location.

A particular advantage of the embodiments 7-10, is that the process of storing volatile configuration register contents on the chip, does not repeat itself every time the system starts. Such repetition is not needed and also, non-volatile memories or NVMs suffer from being written to, time and again, to the same places.

Embodiment 11. A failure analysis method comprising:
providing at least one failed chip which typically includes, in the failed chip,
non-volatile memory (NVM) and/or
volatile configuration registers; and/or
NVM writing functionality typically configured to, at least once, write bits indicative of at least one setting stored in at least one of the chip's volatile configuration registers, typically onto the non-volatile memory; and/or
retrieving the bits and, typically, configuring the chip accordingly when reconstructing the chip's failure.

The chip's configuration typically includes all settings stored in all the chip's configuration registers.

Typically, but not necessarily, the bits written onto the NVM, are all or some of the bits stored in all or some of the chip's volatile configuration registers. Or, the bits written onto the NVM may be reversibly derived from bits stored in the chip's volatile configuration registers, such that the some or all bits stored in the chip's volatile configuration registers may be derived by retrieving, during failure analysis, the bits actually stored in the chip's NVM. For example, if, for some reason, the bits written onto the NVM. are known to be the inverse of the bits stored in the configuration registers (e.g. for each "1" stored in the configuration registers, a '0' is written onto the NVM, and vice versa, for each "0" stored in the configuration registers, a '1' is written onto the NVM), then during failure analysis, the inverses of the bits read from the NVM, thereby to derive values which are then loaded into the chip's configuration registers.

To configure the chip according to the retrieved bits when reconstructing chip failure: if all bits which were loaded into all of the chip's configuration registers when the chip was running (and presumably when the chip failed) are stored in, or derivable from, the chip's NVM, then load all of these bits into the chip's configuration registers and proceed to reconstruct the failure. If less than all bits which were loaded into all of the chip's configuration registers when the chip was running (and presumably when the chip failed) are stored in, or derivable from, the chip's NVM, then load whichever bits are available, into the chip's configuration registers and proceed to reconstruct the failure by "scanning" all configuration options which are compatible with the available bits (with the NVM-stored bits). For example, if all but 5 of the chip's configuration registers are stored in the chip's NVM, configure the chip accordingly and run the chip for each possible configuration of the remaining 5 registers, until the failure is reconstructed for one such configuration.

Embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing systems, communication devices, processors (e.g. digital signal processors (DSPs), microcontrollers, field programmable gate arrays (FPGAs), application specific integrated circuits (ASICs), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

BRIEF DESCRIPTION OF THE DRAWINGS

Certain embodiments of the present invention are illustrated in the following drawings.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Any logical functionality described herein may be implemented as a real time application, if and as appropriate, and which may employ any suitable architectural option such as but not limited to ASIC or DSP or any suitable combination thereof. Any hardware component mentioned herein may in fact include either one or more hardware devices e.g. chips, which may be co-located or remote from one another.

DETAILED DESCRIPTION OF CERTAIN EMBODIMENTS

Devices manufactured by an IC (Integrated Circuit) manufacturer have many configuration options, provided to enable IC usage flexibility and/or matching of device functionality to system-specific and application-specific requirements. IC configuration is most typically set using registers. The registers which set the IC configuration, aka "configuration registers", are most commonly volatile, therefore non-default configuration settings are lost as soon as power is turned off. For the system itself, this is not an issue, because the device is in the system, and the system also has software or firmware code, which configures the device according to the exact, specific configuration required for that specific system. Typically, each time the system powers up, the software or firmware code programs the configuration registers anew by replacing certain default IC configuration settings stored in the configuration registers, with non-default settings stored in the software or firmware code. This could also be based on some table, which may be referenced or accessed based on some external (to the chip) input, e.g. indicative of the system model, which dictates which configuration option, from among a set of configuration options, is to be applied by the firmware code.

Unfortunately, the volatility of the IC's configuration registers is an issue for the IC manufacturer's failure analysis engineers. In many cases, IC manufacturers ship devices to customers, and, subsequently, devices are rejected by customers. Due to the configuration settings being volatile, the failure analysis engineers find themselves devoid of any knowledge on the exact way the failed devices had been configured in the customer's system. The failure analysis engineers do not have the customer's specific system at hand, and it is unrealistic to assume that they could obtain a customer's system for each failure. Thus, today, failure analysis of a rejected chip often has to proceed entirely "out of context". In some cases, failure analysis engineers do not even know which system model the rejected devices were dismounted from.

Certain embodiments enable failure analysis engineers to more easily debug and identify a problem which has caused a device to fail, by providing the engineers with knowledge of how the device was configured and operated when it exhibited that problem.

Knowing how the chip was operated in the system is very useful in such failure analysis. For example, the failure may occur only in certain conditions, and knowing how the chip was operated, and/or in which system, may aid in determining these conditions, under which the device failed, whereas another device, perhaps because they did not undergo these exact conditions, did not fail. It is appreciated that, then, the device manufacturer may perhaps modify the device design even at this late stage, or require devices to undergo a test which ensures devices will no longer fail the same way, or simply discard them, or take any other suitable action.

A customer may reject a device either during system R & D, or later on, e.g. during system mass production. Devices are typically installed in larger (large?) customer systems. A system with the device installed, once complete, is then powered-on and verified. The system may fail during operation or verification. In such cases, e.g. by using a conventional debug flow, the customer may conclude that the device is the likely cause of the failure. The customer may then de-solder the device and send it to the device manufacturer for analysis. If this happens during system R&D rather than during system mass production, there may be a customer R&D team which can informally provide the device engineers with information on the system and how the device was configured and being used when it failed. Deep into mass production, however, no such team is available, and it becomes very difficult for the device manufacturer to obtain any orderly information as to how exactly the device was configured and was being utilized when it failed. Certain embodiments seek to provide a failure analysis method comprising:

providing a population of integrated chip systems, each integrated chip comprising volatile configuration registers, at least one non-volatile memory M reserved for storing contents of at least one register R, from among the volatile configuration registers; and apparatus configured for storing a copy of contents of at least register R, onto the non-volatile memory M; and when an individual chip system in the population is returned due to responsibility for a failure, conducting failure analysis on the individual chip system including retrieving the contents of the register R from the memory M, thereby to retrieve a characterization of the configuration of the individual chip system when the individual chip system failed, and configuring the individual chip system accordingly in order to reproduce the failure.

Certain embodiments seek to keep records of ICs' configurations including recording all, or at least key, hardware and/or firmware configuration inside the IC, for future reference in case of need for failure analysis.

Figure 1:
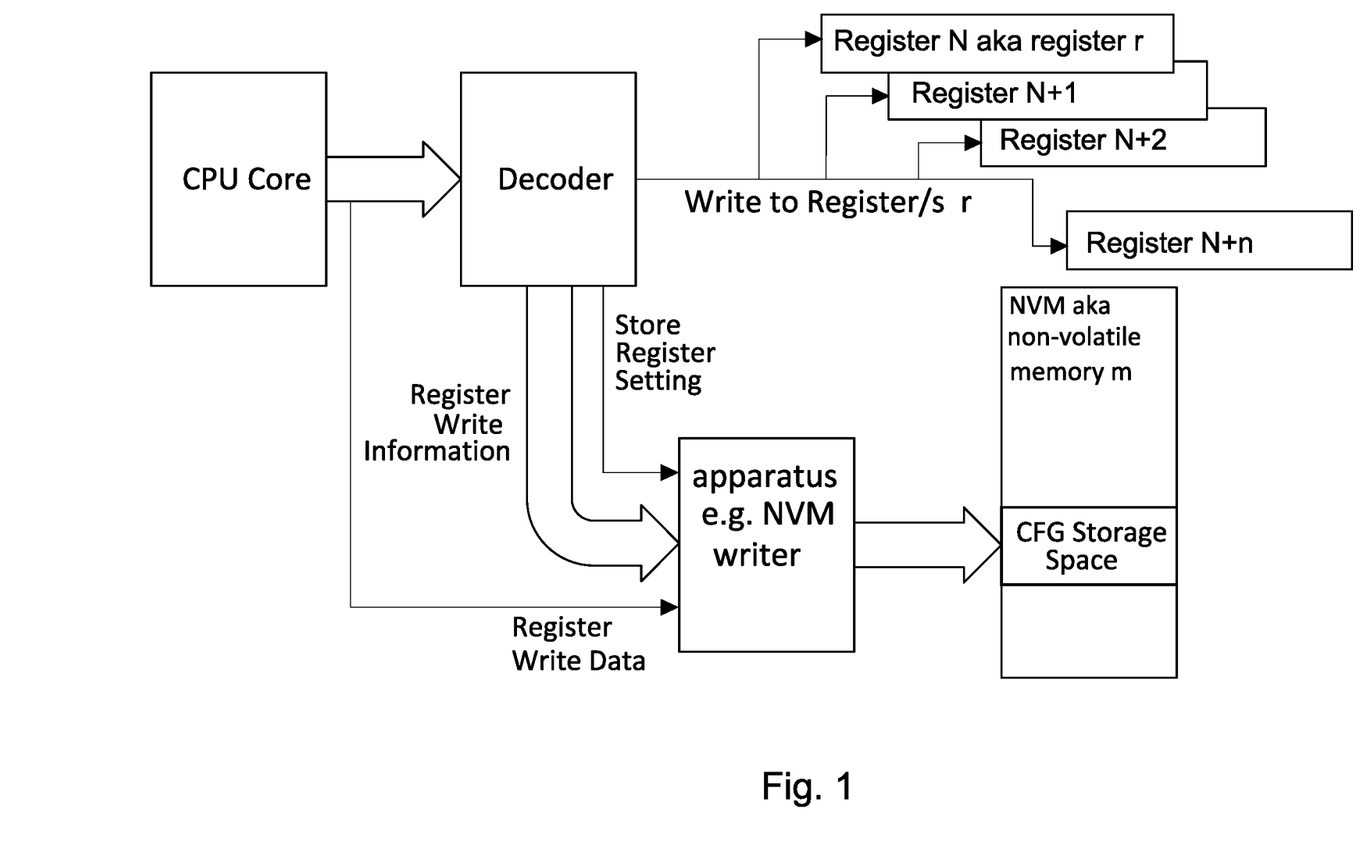
FIG. 1 is a simplified block diagram illustration of a chip system provided in accordance with an embodiment, including all or any subset of the illustrated blocks, all typically in a single chip.

Certain embodiments include a chip system including, e.g. as shown in FIG. 1, all or any subset of the following (all typically in a single chip):

volatile configuration registers programmed by firmware, such as registers N, N+1, N+2, . . . Register N+n as shown in FIG. 1.

(typically the firmware resides in memory available or accessible to the processor configuring the device. Both the processor and the memory may reside inside or outside the device whose configuration it is sought to keep);

non-volatile storage space aka NVM inside the chip; and apparatus for recording contents of at least some of the registers in the NVM.

The information kept in the NVM may include all or any subset of the following:
1. A predefined set of register configuration values—clocking, pin muxing, etc.
2. A predefined set of firmware configuration and operation mode settings—e.g. number of temp sensors, number of fans and which pins, other specific parameters.
3. A predefined set of OEM (original equipment manufacturer)-defined parameters.

It is appreciated that the above are mere examples of possible purposes of (or contents of) configuration registers which are not intended to be limiting. The apparatus for recording contents may be implemented in hardware or in firmware. If in hardware—the apparatus for recording contents typically includes "write-back" hardware; wherein, each time the firmware programs any register within at least a predefined subset of the registers, thereby to define a configuration to be applied to the chip, the hardware stores configuration data, representing the chip configuration, in the NVM (typically automatically, typically without any user or firmware intervention), thereby to ensure that the configuration applied to the chip is kept persistently. Typically, the configuration data includes the exact bits in the register.

The predefined subset of registers may be the set of all configuration registers, in which case all content of all configuration registers would be stored. Or, if the NVM capacity required to store all configuration registers is too "costly", a subset of the more important registers may be defined, and the storage would be only for the content of the important subset, and not for the content of configuration registers outside of the important subset.

Typically, during the architectural definition of a future IC which is to keep at least some configuration registers' contents, the developers of the IC decide which are the subset of registers important enough to be recorded for future debug. This is then, typically, defined as part of the architecture of the future IC, and implemented.

Typically, each time the firmware writes a value in at least one of the registers, the hardware receives the value and stores the value in a predefined location in the NVM.

Re "Predefined"—any predefined information may be written in company documentation. For example, the internal-or-external specification of the device, which is a natural language document, may include an indication that "The values of registers A, B, C of module X can be obtained from NVM addresses D, E and F, respectively. The values of registers H, I and J of module Y can be obtained from NVM addressed K, L and M, etc.

Typically, when a device is received from the field and undergoes failure analysis, the contents of the subject NVM area are dumped or accessed or downloaded, e.g. as a computer file, and the configuration information is available. The Failure Analysis personnel then may have all this information available to facilitate analyzing and testing the device, such that they can focus the analysis on the specific configuration used by the chip on the specific system in which it was used. The following is an example of how time-consuming it is to thus focus the analysis: a device has 77 user-selectable clocking options. The device is rejected by the customer, and no engineer is available on the customer's team to identify which clocking option was being used when the device failed. Conventionally, this would force the failure analysis engineers to analyze or verify the device under all 77 clocking options. However, if the clocking setting which was practically applied in the system is available to the failure analysis engineers, e.g. as described herein, the device need be verified only under this single clocking setting, saving a great deal of debug time, and allowing the problem to be identified much faster.

Conventionally, when rejected devices reach a device manufacturer for failure analysis, the failure analysis engineers may not even know which system model the failed devices were dismounted from.

The system model may be recorded on the device e.g. there may be code programming some system ID in NVM, if the code has this information. However, typically, having the configuration information as described herein means that the failure analysis engineer no longer needs to know the system model.

With particular applicability to firmware implementations, it is appreciated that a chip conventionally has two operational states:

State 1. Pre-operation (the state in which the devices wakes up after power-up)

State 2. Fully-configured operation (the state after the device is fully configured).

Typically, an apparatus for recording contents includes firmware code running in the device which, when a chip is in the latter, fully-configured operation state, takes a predefined subset of configuration parameters (reading and then writing these parameters to a "predefined" place in NVM) e.g. so as to record at least the subset of configuration parameters in the NVM.

A method of operation including all or any subset of the following operations, suitably ordered e.g. as follows, may be provided e.g. as an extension to, or trigger of, the NVM writer, so the writer only works once:

Operation 1a. At the chip design stage, select, from among configuration registers on the chip, which configuration registers' content to store.

Operation 1b. Reserve sufficient NVM space, within the total space available on the chip, in order to store the content selected in operation 1a, by ensuring that none of the firmware and hardware on the chip are configured to use a certain reserved memory location for their own purposes i.e. for purposes other than storing configuration registers' content which is provided by the NVM writer.

Operation 1c. In addition to the NVM space reserved to store configuration registers' content, also allocate NVM bit/s in which to keep a non-volatile indication or indicator, in the chip, to serve for either allowing/triggering or, e.g. by omission, preventing/inhibiting, the NVM writer, typically depending on whether the configuration registers' content has not yet, or has already, been written to the NVM. The non-volatile indicator may include a single bit (done/not done), or, for safety, more than one bit.

Operation 1d. According to an embodiment, when generating the application firmware code responsible inter alia for configuration of the chip, add logic which, when device configuration is finished, sets the non-volatile indicator e.g. to "done" or to "not done" (e.g. the configuration registers' content has not yet been written to the NVM).

The "application firmware code" is typically the device's (or chip's) firmware code which executes whatever primary application the device (in which the chip was embedded e.g.) was made for. Typically, one of the first operations the application firmware does is configuring the device or chip that the firmware runs on and operates. This configuration is typically performed in a sequence of firmware commands executing a corresponding sequence of writes to registers. If this sequence, which takes some time, is completed successfully, the end result is that all necessary values have been stored in the chip's configuration registers. However, sometimes, the sequence fails to complete successfully, in which case, less than all necessary configuration values are stored in the NVM.

So, the mechanism or NVM writer takes care to repeatedly operate it, e.g. until the FW code marks configuration as done.

Operation 2a. Upon each exit of the system (of the application system in which the chip is embedded) from reset (e.g. any power or reset cycles), if the indicator says "done", the NVM writer is kept disabled, hence does nothing, and the flow ends.

Operation 2b. If not (if indicator says that keeping the configuration has not yet been done, or has not yet been written to the NVM, a decoder (e.g. as shown in FIG. 1) provides a trigger (e.g. "Store Register Setting" in the drawing) to the NVM writer.

The decoder typically identifies both the write to the configuration register and the fact that the register is one of those selected in operation 1a.

Figure 2:
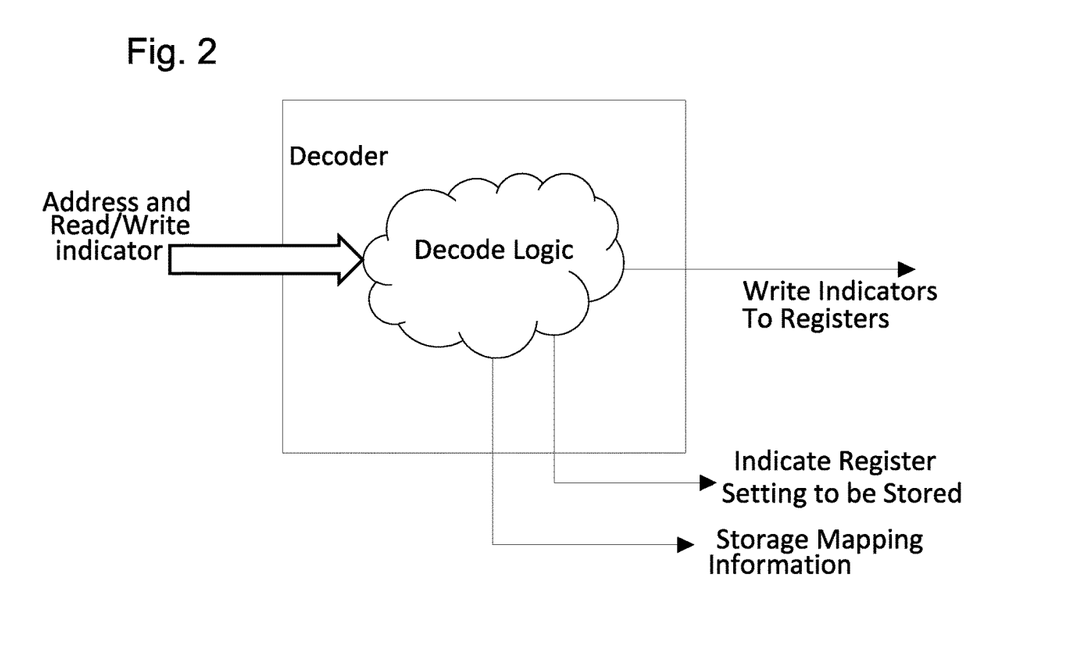
FIG. 2 is a decoder provided in accordance with an embodiment, which may be used to implement the decoder of FIG. 1.
Figure 3:
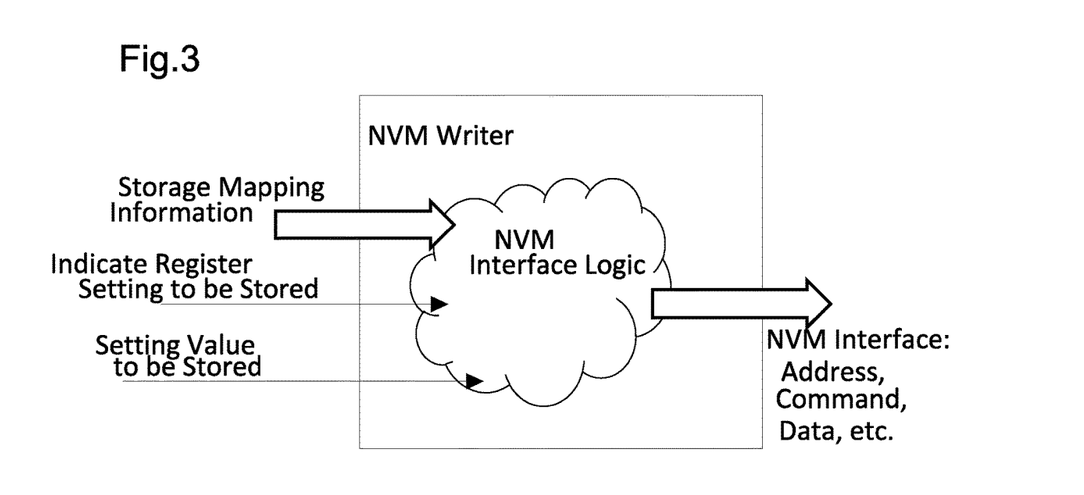
FIG. 3 is an NVM writer provided in accordance with an embodiment, which may be used to implement the NVM writer of FIG. 1.

Example decode logic is shown in FIG. 2.

Operation 3. responsively to the trigger:

Operation 3a. NVM writer reads the designated storage address (e.g. the address within the on-chip memory, which has been reserved for keeping the configuration).

Operation 3b. If the value at the designated storage address is at default (erased), the NVM writer writes the register value to the designated location (designated storage address).

Else (e.g., if the value at the designated storage address is not at default (is not erased), NVM writer skips writing operation 3b, because the register value may be assumed to have already been stored in a previous configuration sequence.

Operation 4. Upon completion of chip configuration, the application firmware code responsible for configuration of the chip, which knows exactly when chip configuration is finished, sets the indicator e.g. to "not done".

Thus, if (e.g. due to user interruption or system malfunction), configuration is not completed in one sequence, subsequent sequences of application firmware commands executing registers' writes will complete configuration, and write operation 3b will be performed in those subsequent sequences.

It is appreciated that embodiments herein are useful for supporting analysis of failures resulting from manufacturing defects, and may also be useful for finding design defects not discovered in earlier phases.

According to certain embodiments, a method is provided which includes all or any subset of the following operations, suitably ordered e.g. as follows: a. Chip manufacturer designs a chip architecture including, inside the chip:

volatile configuration registers at least one non-volatile memory M reserved for storing contents of at least one register R, from among the volatile configuration registers; and hardware or firmware configured for storing a copy of contents of at least register R, onto the non-volatile memory M;

b. Chip manufacturer generates product literature including a human-readable description of the non-volatile memory reserved for storing contents of at least one of the volatile configuration registers;

c. Chip manufacturer manufactures a population of chips;

d. Chip manufacturer conducts production testing to identify defective chips e.g. chips which suffer from a manufacturing defect. However, production testing may suffer from yet un-known "testing coverage pinhole/s" which may leave occasional defective chips undetected. So, for example, 95% (say) of the chip may have been made perfectly and may test perfectly, whereas 5% (say) have manufacturing defects. Of those, the vast majority, perhaps well over 4.9%, are successfully filtered out or screened by the existing production tests, but e.g. at a given moment in time, a very minute percentage, say a few DPPM (defective parts per million), have manufacturing defects and nonetheless are not yet screened, thereby to define a pinhole in the test coverage;

e. Chip manufacturer provides post-production-testing chips, including, possibly, a defective chip, to a customer. Chips are in their pre-operation state; customer installs chips in his system (aka "application system");

f. Each time the application system powers up, system's processor or s/w or f/w code configures the chip including replacing register R's content (e.g. default; or "reset value") with system-selected configuration value/s; and the hardware or firmware, triggered by replacement of register R's content, copies the system-selected configuration value/s into the on-chip (i.e. inside the chip) non-volatile memory M.

It is appreciated that operation e onward relate to the unusual chip, within a huge population of chips that pass production testing, which passes through a pinhole and carries a manufacturing defect, unlike the vast majority of its counterparts, which are typically not defective and therefore operation e onward do not apply to them;

e. The application system typically eventually fails; customer de-solders the chip and returns the de-soldered chip, which is being blamed for the failure, to chip manufacturer's failure analysis engineers. Typically, the customer provides the engineers with only vague information, or none, as to the failure (e.g. "the system doesn't boot" or "system display remains black");

h. Chip manufacturer's failure analysis engineers dump the chip's non-volatile memory M, then consult product literature to identify contents of which volatile configuration register is stored there, thereby to become at least partly aware of the configuration of the chip, when it failed;

i. The more completely the configuration of the chip, when it failed, is known, the more easily and quickly the chip manufacturer's failure analysis engineers can achieve the goal of reproducing or reconstructing the failure (causing the reported failure to actually happen, again). The time required to reconstruct the failures is reduced because the number of chip configurations that need to be tried in order to reconstruct the reported failure, is reduced, typically by the same factor.

Example: a certain chip design has two clock domains, which means that there are 2 logic domains, each clocked at a different frequency. A certain chip with this design suffers from a defect. This defect causes failure only when there is a certain relation between the two clocks in use—perhaps only when the first clock is exactly twice the second clock. Conventionally, little or no information is available as to the real configuration of the chip when it failed. Thus, to reconstruct the reported failure, engineers need to analyze the behavior of the chip many times—over all of the many frequency combinations of the two clocks, until one combination of frequencies happens to result in the reported error, which statistically is likely to occur only after, say, half of the many frequency combinations has been laboriously checked, one by one. However, according to an embodiment of the invention, the pair of frequencies which was set, is recorded in a location that is identified by the product literature. This is advantageous because failure analysis engineers need then test the chip (to verify that the reported failure indeed recurs) only with this one very specific clock configuration, which shortens the time it takes to identify the root cause of the failure;

j. Failure analysis engineers identify the testing coverage pinhole which allowed the above successfully reconstructed failure to occur. Once failure reconstruction has been facilitated by identifying the configuration under which the chip was operating when the chip failed, any conventional method may be used to identify where the coverage pinhole is e.g. by determining which specific function in the chip is causing the overall failure. For example, perhaps the pinhole results from the fact that the existing testing flow of the chip does not detect that a certain clock generator is producing an incorrect clock frequency, or that a certain address decoder is preventing a certain register access, or that a specific flip-flop is malfunctioning, and this clock generator (or address decoder, or flip-flop) is what caused the overall failure;

k. Failure engineers implement a testing "patch" which closes the testing coverage pinhole. For example, failure engineers devise a test, to be added to the existing testing flow, which checks that the overlooked clock generator is producing the correct clock frequency, or that the overlooked address decoder is not preventing register access, or that the overlooked flip-flop is functioning properly, and so forth.

Thus the engineers are able to conduct more efficient failure analysis because the configuration of the chip, when the chip failed, is at least partly known to them. It is appreciated that reconstruction of the failure, facilitated by the method herein, is often the biggest challenge in the FA process.

It is appreciated that, more generally, once failure reconstruction has been facilitated by identifying the configuration under which the chip was operating when the chip failed, any conventional method may be used to identify where the coverage pinhole is.

It is appreciated that a device may be operational even if it has failed, since failure could be partial (perhaps just one specific function, or just one specific signal has failed or is broken) and need not mean the device is completely dead, so the device may still be able to operate, allowing the failure to be observed which may yield information for debug and failure analysis.

It is appreciated that many possible implementations are possible, depending inter alia on the microarchitecture of each given chip, and on the specific memory in use.

A particular advantage of certain embodiments is that, generally, volatile registers cannot all be replaced by non-volatile registers, since, practically, a memory, whether volatile or non-volatile, does not have availability from outside, or "tentacles" to each and every bit, which is exactly what is typically required for configuration registers. While it might be possible to store a configuration in NVM, and then have firmware copy (i.e. store a copy of) that configuration, the embodiments herein may achieve this automatically, rather than, say, involving the user of the device in getting this done.

The mechanism or NVM writer herein may be implemented as a (finite) state machine on the chip; any suitable hardware implementation of the state machine may be used using known techniques e.g. as described in conventional texts such as that posted at the following https online link: mitpress.mit.edu/books/finite-state-machines-hardware.
Typically the state machine gets address information and data and produces an NVM write transaction. Firmware, if used to implement certain embodiments herein, may be held in non-volatile memory, e.g. Flash or ROM.

Alternatively, certain embodiments described herein may be implemented partly or exclusively (i.e. without firmware) in hardware, in which case some or all of the variables, parameters, sequential operations and computations described herein, may be in hardware.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Features of the present invention, including operations, which are described in the context of separate embodiments, may also be provided in combination in a single embodiment. For example, a system embodiment is intended to include a corresponding process embodiment, and vice versa. Features may also be combined with features known in the art, and, particularly, although not limited to those described in the Background section or in publications mentioned therein. Conversely, features of the invention, including operations, described for brevity in the context of a single embodiment or in a certain order may be provided separately or in any suitable sub-combination, including with features known in the art (particularly although not limited to those described in the Background section or in publications mentioned therein) or in a different order. "e.g." is used to denote an example not intended to be limiting. Each method may comprise some or all of the operations illustrated or described, suitably ordered e.g. as illustrated or described herein.

The invention claimed is:

1. A failure analysis system, the system comprising at least one chip which includes; non-volatile memory (NVM) volatile configuration registers; and NVM writing functionality configured to, at least once, write bits indicative of at least one setting stored in at least one of the chip's volatile configuration registers, onto the non-volatile memory; and to retrieve said bits and to configure the chip accordingly when reconstructing the chip's failure, wherein said NVM writing functionality is configured to retrieve and to configure when reconstructing the chip's failure by identifying a configuration under which the chip was operating when the chip faded including retrieving said bits and configuring the chip accordingly, thereby to facilitate failure analysis of said at least one chip, if and when said at least one chip fails.

2. The system according to claim 1 wherein said reconstructing the chip's failure comprises causing a reported failure of the chip to recur.

3. A system according to claim 1, wherein:
said non-volatile memory comprises at least one on-chip non-volatile memory m including at least one reserved memory location, which is reserved for storing contents of at least one volatile configuration register r, from among the volatile configuration registers; and
said NVM writing functionality comprises apparatus configured for, at least once, storing values indicative of content of at least one volatile configuration register r from among the registers, in the on-chip non-volatile memory m, at the at least one reserved memory location.

4. A system according to claim 3 wherein said apparatus comprises hardware, inside the chip.

5. A system according to claim 3 wherein said apparatus comprises firmware, inside the chip.

6. A system according to claim 3 wherein said apparatus aka "NVM writer", during a write to said at least one volatile configuration register r, receives an address of said at least one volatile configuration register r, receives at least some data written to said at least one volatile configuration register r, and stores said data in said at least one reserved memory location.

7. A system according to claim 3 wherein the apparatus is triggered by a trigger and wherein the trigger is, at least once, generated upon identification of a write to said register r.

8. A system according to claim 3 wherein said apparatus is configured to store said contents in said memory m, only when the application system in which the chip resides first powers-up, and not on each subsequent power-up of the application system.

9. A system according to claim 3 wherein said apparatus, having once stored contents of said at least register r, in the on-chip non-volatile memory m, is then inhibited aka disabled, at least once, from storing contents of said at least register r, in the on-chip non-volatile memory m.

10. A system according to claim 9 wherein said apparatus, having once stored contents of said at least register r, in the on-chip non-volatile memory m, is thereafter inhibited from ever again storing contents of said at least register r, in the on-chip non-volatile memory m.

11. A system according to claim 3 wherein a trigger of said apparatus is provided whose logic ensures that said apparatus does not, during subsequent writes to said register r, store data written to register r, in said at least one reserved memory location.

12. The system according to claim 3 further comprising an indicator which inhibits the apparatus after the apparatus runs once.

13. A failure analysis method comprising:
providing at least one failed chip which includes, in the failed chip,
non-volatile memory (NVM)
volatile configuration registers; and
NVM writing functionality configured to, at least once, write bits indicative of at least one setting stored in at least one of the chip's volatile configuration registers, onto the non-volatile memory; and
retrieving said bits and configuring the chip accordingly when reconstructing the chip's failure,
said retrieving and configuring when reconstructing comprises reconstructing the chip's failure including identifying a configuration under which the chip was operating when the chip failed by retrieving said bits and configuring the chip accordingly.

14. The method according to claim 13 wherein said reconstructing the chip's failure comprises causing a reported failure of the chip to recur.

\* \* \* \* \*